Dec. 15, 1936.　　　B. M. SHORT　　　2,063,958
BUMPER GUARD
Filed Jan. 29, 1934
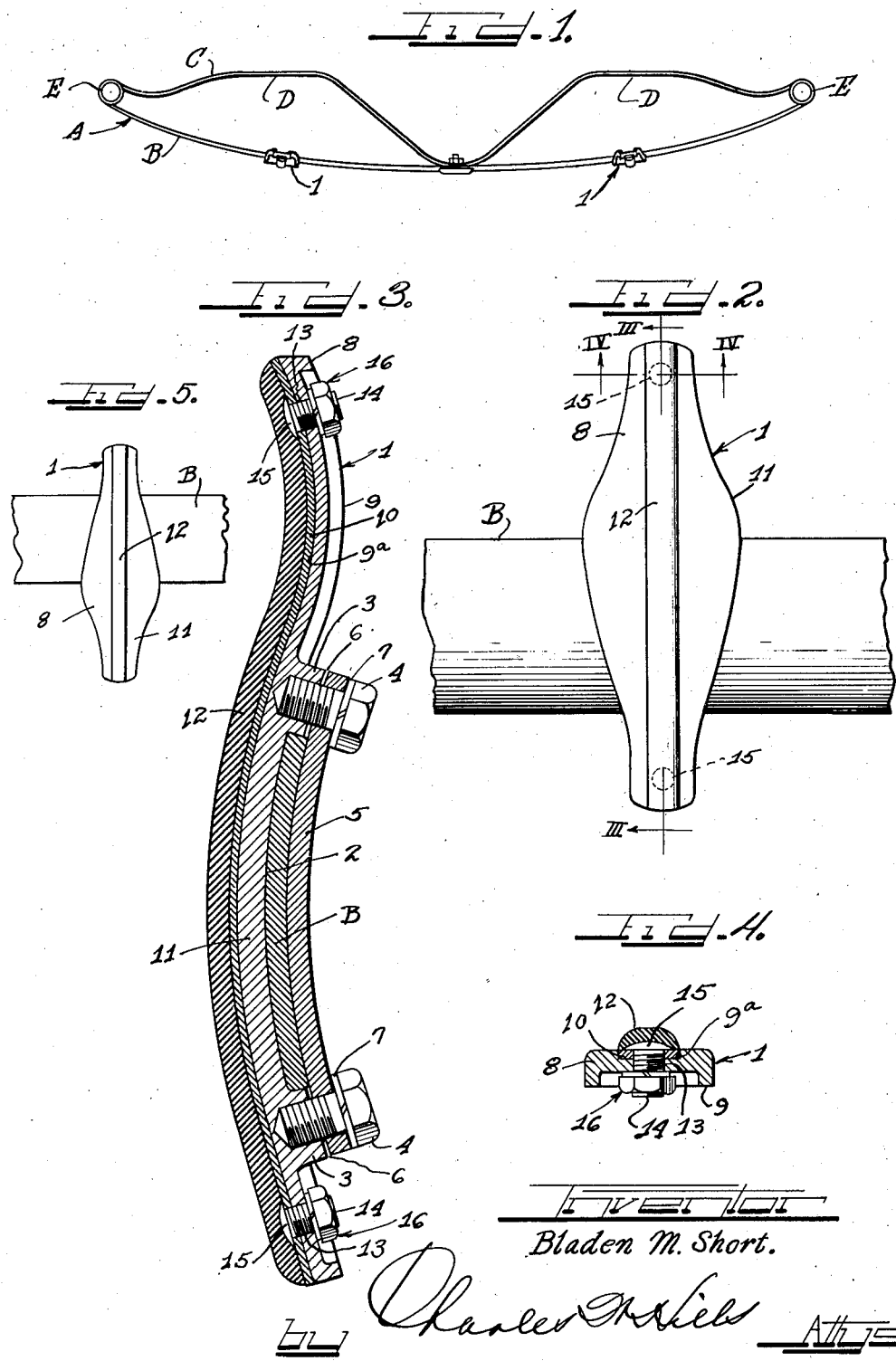
Inventor
Bladen M. Short.

Patented Dec. 15, 1936

2,063,958

UNITED STATES PATENT OFFICE 2,063,958

BUMPER GUARD

Bladen M. Short, Detroit, Mich., assignor to General Spring Bumper Corporation, Detroit, Mich., a corporation of Michigan Application January 29, 1934, Serial No. 708,730

7 Claims. (Cl. 293—55)

This invention has to do with bumpers and is more particularly concerned with guards for bumpers.

It is an object of the invention to provide a guard of such character as not only to protect the finish of the impact bar of a bumper but to serve additionally to prevent interlocking of bumpers of different automobiles.

It is another object of the invention to provide a bumper guard with means for protecting the finish of the guard itself as well as the bumper impact bar.

It is another object of the invention to provide a bumper guard with cushioning means such as rubber for protecting the guard upon impact with a part of another vehicle or object.

It is a further object of the invention to provide a bumper guard with a rubber and metal protective member, wherein the rubber is vulcanized or bonded to the metal so as to be practically inseparable therefrom.

It is a still further object of the invention to provide a bumper guard with a protective cushioning member and to mount said member on the guard independently of the means for mounting the guard on the bumper.

In accordance with the general features of the invention, the improved bumper guard comprises a preferably elongated member of substantially greater length than the height or width of the bumper impact bar with a preferably longitudinal groove in which an insert is disposed. The insert comprises preferably a strip of cushioning or resilient material such as flexible rubber bonded or vulcanized to a corresponding strip of metal, the same being positioned in the groove of the strap so that the resilient means is outermost. When the strap is mounted on the front of the impact bar, the resilient means projects forwardly of the adjacent surface portion of the guard and consequently of the front surface of the impact bar, thereby serving to protect both sets of surfaces from injury which would otherwise be caused if such surfaces were allowed to directly contact the hard parts of an automobile or other object with which the impact bar and guard may collide in use.

Bolts having their heads positioned between the metallic and resilient portions which are vulcanized together are arranged to extend rearwardly through both the metallic part and the guard and to be held in place by suitable nut means. Any suitable means may be employed for securing the guard to the impact bar.

Further objects and advantages of the invention will appear as the description proceeds.

This invention (in a preferred form) is illustrated in the drawing and hereinafter more fully described.

On the drawing:

Figure 1 is a plan view of one form of bumper embodying one form of the invention.

Figure 2 is an enlarged elevational view of a part of Figure 1, the bumper impact bar being shown fragmentarily.

Figure 3 is an enlarged longitudinal sectional view taken substantially in the plane designated by the line III—III in Figure 2.

Figure 4 is an enlarged fragmentary sectional view taken substantially in the plane designated by the line IV—IV in Figure 2.

Figure 5 is an elevational view similar to Figure 2 but with the guard projecting more below and less above the bumper.

As shown on the drawing:

Referring now more particularly to the drawing, one form of bumper in connection with which the invention is adapted for use is designated by the reference character A and includes a longitudinally and transversely arcuate impact bar B and a back bar C having spaced portions D for securement to the vehicle and connected at their ends by any suitable eye construction at E. Disposed in preferably symmetrical relation to the ends and center of the impact bar B are two guards I constructed in accordance with one form of the invention. The guard I may have any suitable ornamental design or shape and may be cast or formed by stamping operations. It is preferably arcuate at its rear surface 2 to conform with the front arcuate surface of the impact bar B, although it is to be understood that the shape of the surface 2 and associated attaching parts of the member I may be varied in accordance with the shape of the impact bar to which the guard is to be attached, both as to the longitudinal and transverse contour of the impact bar. In Figure 3, the guard I is shown as provided with attaching bosses 3 which are tapped to receive the threaded shanks of attaching screws 4, a clamp plate 5 being also provided with openings through which the screws 4 pass. The bosses 3 preferably project rearwardly of the surface 2 a distance somewhat less than the thickness of the impact bar B, leaving clearance at 6 between said bosses and the clamp plate 5 so that the latter may be drawn toward and into tight engagement with the bumper bar B to thereby rigidly mount the guard 1 thereon. Lock washers 7 are preferably provided to prevent accidental loosening of the bolts 4.

The illustration of Figure 3 discloses the guard 1 in conjunction with an impact bar of the greatest width to be accommodated thereby. It is to be appreciated, however, that bumper bars of substantially less width than that shown may be accommodated by the same guard, the configuration of the parts being such as to enable the guard to be rigidly attached to the bumper notwithstanding differences in width of the bumper bar accommodated between the bosses 3.

The guard 1 in the illustrated embodiment of the invention is of a shallow S shape with preferably its upper end 8 curved forwardly to assist in preventing the bumper of another car from "climbing" over the upper end thereof. It is to be appreciated that the guard may be mounted with the forwardly curved portion lowermost as shown in Figure 5, in which event of course the forwardly projecting portion will serve to resist the climbing under by the bumper of another car.

The guard member 1 may if desired be formed with a peripheral rearwardly extending flange 9 for the purpose of reinforcement as well as to provide a protective pocket for the attaching instrumentalities for the impact structure now to be described.

The guard member 1 is provided with a preferably longitudinal groove 9a extending throughout its entire length as shown or partially if desired. The cushioning means forming one of the salient features of the invention comprises essentially a two-piece structure embodying a strip of metal 10 of a shape conforming to that of the guard body 11, and a resilient cushioning strip 12 of rubber or other suitable material vulcanized or bonded to the metallic strip 10. The connection between the strips 10 and 12 is such as to substantially integrally unite the same for all practical purposes.

In the fabrication of the combined strip structure 10 and 12, before the same are connected, the metallic strip 10 is provided with holes 13 for receiving the shanks of bolts 14, the heads 15 of these bolts being disposed against the strip surface to receive the cushioning strip 12. When the strips are vulcanized together, the heads 15 are also vulcanized to the strip 12 and anchored to both strips 10 and 12 so as to constitute substantially an integral part thereof.

When the strip structure is to be attached to the body 11, said structure is positioned in the slot 9a in the body 11, with the metallic strip 10 innermost. The depth of the groove 9a may be such as to just accommodate the strip 10, although if desired it may be sufficiently deep to accommodate both the strip 10 and a portion of the cushioning strip 12. The openings 13 in the body 11 are arranged to register with and receive the bolts 14, to the rearwardly projecting ends of which lock washers and nuts designated generally by the reference character 15 are applied so as to rigidly secure the strip structure to the body 11. The means 16 are located in the spaces formed by the flanges portions and are protected thereby.

The portion providing the seat 2 projects rearwardly similarly to the flanges 9 and serves as reinforcing means for the forward part of the guard.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A bumper guard comprising a strap of a length substantially greater than the width of the impact bar to which the same is to be attached and provided with means to attach the strap transversely of the bar so as to materially increase the vertical range of effectiveness of the bar, and cushioning means including an elastic member and a relatively rigid member united together and carried by the strap and projecting forwardly thereof so as to protect the surface of the strap from injury by colliding objects.

2. A bumper guard to be attached to an impact bar and formed so as to extend vertically substantially beyond an edge of the bar, said guard comprising a strap having a groove, and including a laminated insert fitted in the groove, said insert comprising an anchor strip of relatively stiff material and a strip of relatively flexible material integrally united to the anchor strip and projecting clear of the adjacent surface of the strap, and means for maintaining said device in said groove.

3. In a bumper guard to extend vertically beyond an edge of an impact bar and to be secured thereto so as to substantially increase the vertical range of effectiveness of the impact bar, an impact member having a groove in the impact face thereof, a cushioning device fitted in said groove, attaching means extending from said device rearwardly through said member, and means cooperating with said attaching means for securing the cushioning device to the member, said member being provided with a recess in its rear face and the last means being disposed in said recess.

4. A bumper guard to be attached to an impact bar so as to extend vertically substantially beyond an edge of the bar to thereby materially increase the vertical range of effectiveness of the bar, said guard comprising a strap having a substantially vertically extending groove, and a cushioning device including a stiff reinforcing member fitted in said groove and relatively elastic means projecting outwardly beyond the adjacent surface of the strap so as to protect said surface from colliding objects, means associated with the strap for securing the same to an impact bar, and means for securing the cushioning device to the strap, the last named means being spaced from the first mentioned means so as not to interfere with the latter.

5. A bumper guard to be attached to an impact bar so as to extend vertically substantially beyond an edge of the bar to materially increase the vertical range of effectiveness of the bar, said guard comprising an impact member, a cushioning device including an elastic part and a reinforcing member, one of said members having a groove and the other fitting in the groove, and means for rigidly securing the members together with the elastic part extending clear of the adjacent surface of the impact member.

6. A bumper guard to be attached to an impact bar so as to extend vertically substantially beyond an edge of the bar to materially increase the vertical range of effectiveness of the bar, said guard comprising a strap and a cushioning device secured thereto and projecting clear of the adjacent surface of the strap so as to protect the same from injury by colliding objects, said device comprising an anchoring strip of relatively stiff material and an elastic strip laminated thereto so as to be substantially integrally united therewith, and attaching means substantially integrally united with said strips for attaching the cushioning device to the strap.

7. A bumper guard construction comprising an elongated member of a length substantially greater than the width of the bumper to which the same is to be attached and having a rearwardly projecting reinforcing portion providing a seat to fit the front face of the bumper, said seat terminating in spaced rigid upper and lower shoulders for engaging the upper and lower edges of the bumper so as to directly position the member in the desired vertical relation to the bumper, said member, above and below said reinforcing portion, being provided with rearwardly extending peripheral reinforcing flanges, clamping means associated with said reinforcing portion and including a plate engageable with the rear side of the bumper for tightly clamping the member to the front side of the bumper, said member also having a portion vertically beyond the bumper and projecting forwardly to limit relative vertical movement of another member or the like engaging the front of the member, and cushion protecting means carried by and projecting forwardly from the impact face of said member.

BLADEN M. SHORT.